Nov. 24, 1959

C. R. HILPERT 2,913,931

SPEED RATIO GOVERNOR

Filed July 1, 1957

Inventor.
Conrad R. Hilpert.
By JohnODarley
Attorney.

Inventor.
Conrad R. Hilpert.
By John W Darley
Attorney.

Fig. 8

United States Patent Office 2,913,931
Patented Nov. 24, 1959

2,913,931

SPEED RATIO GOVERNOR

Conrad R. Hilpert, Winnebago, Ill., assignor to Twin Disc Clutch Company, Racine, Wis., a corporation of Wisconsin Application July 1, 1957, Serial No. 669,306

10 Claims. (Cl. 74—731)

My invention relates in particular to a governor for use with a power train including a power source, an hydraulic torque converter, and a power shift gear transmission which connects with a load, and broadly to a mechanism for indicating a change in a predetermined speed ratio of a pair of associated shafts forming part of a power train.

Hydraulic torque converters for industrial service such as tractors, power shovels, off-highway and heavy duty trucks, locomotives, etc., as distinguished from those for the automotive field including passenger cars and trucks up to a determined size, are customarily designed to develop maximum efficiency over a relatively wide range of speed ratios. The latter quantity is defined as the speed of the converter turbine divided by that of the converter pump or impeller. The efficiency curve of an hydraulic torque converter has a rising and falling characteristic between stall and racing corresponding to 0.0 and 1.0 in terms of speed ratio and the converter design is such that its most efficient operation is in a selected range between the above end points.

In some operating situations, it is desirable to couple the converter with a power shift gear transmission as a means of improving the flexibility and economy of the power train. Such a situation is presented in locomotive operation and, for convenience, the present invention will be described in connection therewith, but is not limited thereto. Variations in load and grade with a retention of capacity for acceleration of the locomotive and of converter operation in its efficient speed ratio range render necessary a control on the gear transmission shifts such that in any conditioning of the gear transmission the converter will operate in the indicated range.

It is therefore one object of my invention to devise a mechanism that is responsive to one or more determined speed ratios of an hydraulic torque converter and arranged to effect a corresponding number of shifts in the gear transmission, or generally to provide one or more signals or impulses indicating changes in the speed ratios of associated shafts forming part of a power train.

A further object is to provide a mechanism of the character indicated whose operation is rapid and positive at the selected shift point to insure prompt engagement of that clutch which determines operation of the selected gear train in the gear transmission.

A further object is to provide a governor embodying the above characteristics which is free from hunting even in the region of slight deviations from the selected shift speed ratio.

These and further objects of the invention will be set forth in the following specification, reference being had to the accompanying drawings, and the novel means by which the objects are effectuated will be definitely pointed out in the claims.

Figure 1:
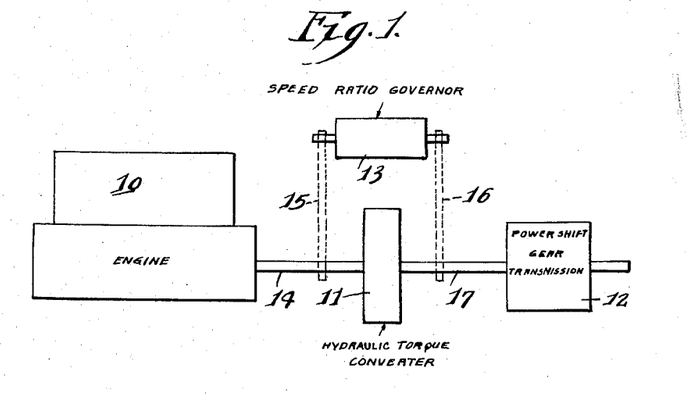
Fig. 1 is a schematic elevation showing the relation of the speed ratio governor to a power train including a power source, an hydraulic torque converter, and a power shift gear transmission.

Referring to Fig. 1, there is illustrated a power train including a power source, such as an engine 10, an hydraulic torque converter 11 of appropriate design for the purpose intended and a power shift gear transmission 12. For use with the governors shown in Figs. 2 and 6 and to conveniently explain the operative principle, there will be described the use of a single governor in effecting a shift in the transmission 12 at one speed ratio of the converter 11, while two governors and two shifts are used with the Fig. 7 unit. Since the transmission 12 is merely the recipient of a signal or signals, in the sense that such signal determines a shift, the signal being initiated by the governor, and per se does not form any part of the present invention, it is only illustrated schematically. For the purpose of disclosure, it will be assumed that the transmission is of the well known constant mesh type in which gear selections are determined by the engagement of one or more clutches which will be regarded as air operated in the present instance.

The governor 13 is responsive to speed ratio changes in the converter 11 through the medium of a speed ratio connector 15 which connects the converter input shaft 14 with one end of the governor 13 and a speed ratio connector 16 which connects the converter output shaft 17 with the other end of governor 13. The speed ratio connectors 15 and 16 may take the form of gear trains, chains or belts and are conditioned so that the speed inputs to opposite ends of the governor 13 bear selected proportional relations to the speeds of the converter input and output shafts 14 and 17, respectively. To avoid terminology confusion in the use of the term "speed ratio," as applied to the connectors 15 and 16 and the converter 11, the former will hereinafter be referred to as belts.

Figure 2:
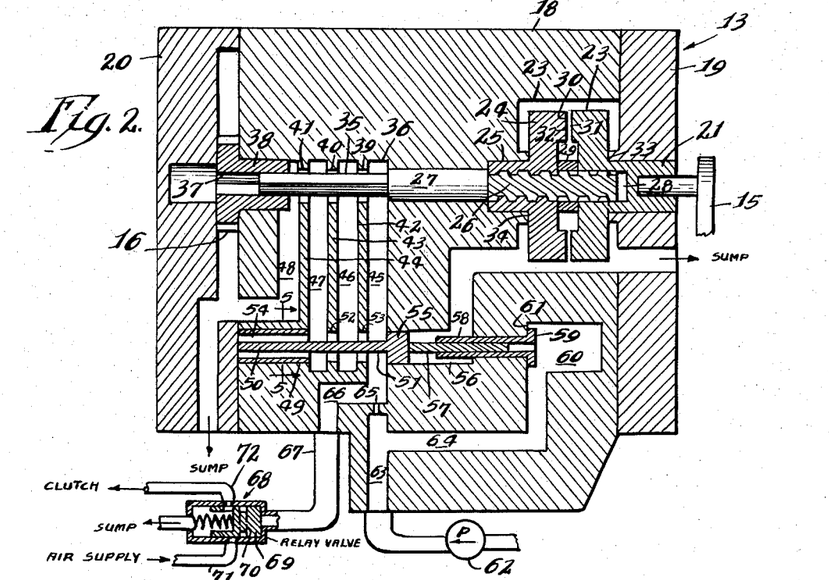
Fig. 2 is a sectional elevation, partly schematic, of one form of the governor in non-shift position for controlling a single shift in the gear transmission.
Figure 3:
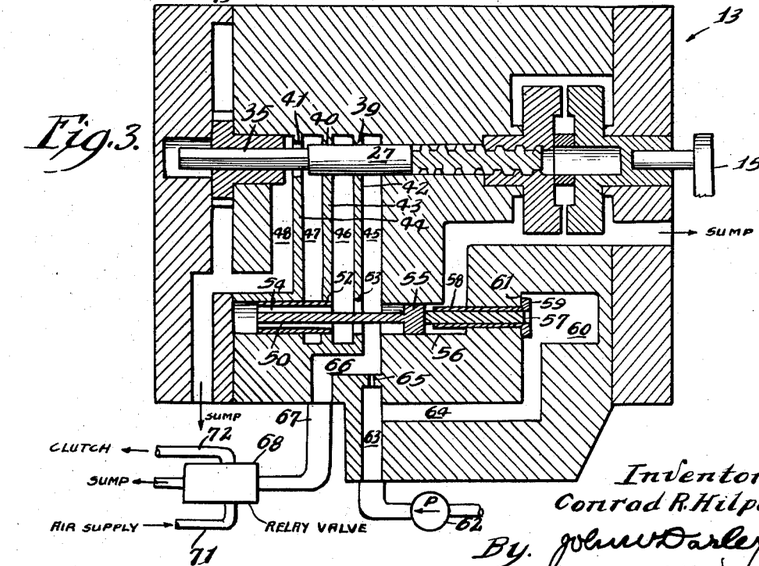
Fig. 3 is a sectional view of the Fig. 2 governor at the beginning of the operation determining a shift of the transmission.
Figure 4:
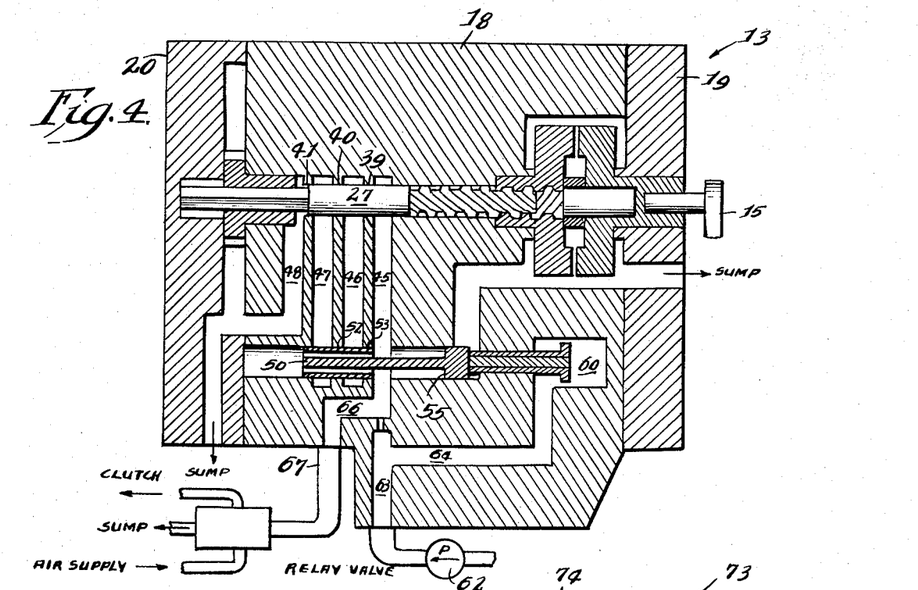
Fig. 4 is a sectional view showing final positions assumed by parts of the Fig. 2 governor in effecting a shift.

For convenience in disclosing the elementary principle of the invention, there are illustrated in Figs. 2, 3 and 4 conditionings of a single shift governor in several phases of its operation, but as will be subsequently shown, the same principle may be incorporated in a governor for effecting two or more shifts of an associated gear transmission.

Referring to Fig. 2, the governor 13 is shown in reversed position from that indicated in Fig. 1 in that the belts 15 and 16 are located at the right and left ends of the governor rather than contrary as in Fig. 1.

The governor 13 includes a casing 18 having end plates 19 and 20 and through the former plate extends a hub 21 that is drivenly connected to the input belt 15 whose speed is related to that of the converter input shaft 14 and hence to engine speed. Within a cavity 22 in the casing 18, the hub 21 carries a permanent magnet disk 23 which is magnetically related to an armature disk 24 having a hub 25 that is journaled in the casing 18 and has screw relation to a threaded portion 26 on the right end of a cylindrical valve 27 slidable and rotatable in the casing 18. The hub 21 is cored to slidably receive the threaded portion 26 and, in the particular arrangement shown, the disks 23 and 24 are separated by a spacer sleeve 29 which establishes a slight air gap 30 between the opposed, annular and magnetic working faces 31 and 32 of the disks 23 and 24, respectively. However, it is considered to lie within the scope of the invention to have the faces 31 and 32 in contact. The disks 23 and 24 are held against axial movements by shoulders 33 and 34 acting in conjunction with the spacer sleeve 29.

The left end of the cylindrical valve 27 is reduced and squared or splined to provide a driven stem 35 which, in the position of parts shown in Fig. 2, extends across the upper part of a chamber 36 within the casing 18 and is slidably received within a similarly shaped hole 37 in the hub of a member 38 that is journaled in the casing 18 and is driven by the converter output belt 16 so that rotation of the hub 38 effects rotation of the valve 27.

As also shown in Fig. 2, the stem 35 extends in spaced relation through ports 39, 40 and 41 which are aligned and respectively provided in spaced, parallel walls 42, 43 and 44 which extend across the chamber 36 transversely of the stem 35. The wall 42 defines with the adjacent surface of the chamber 36 a passage 45; the walls 42 and 43, and the walls 43 and 44, respectively, define passages 46 and 47; and the wall 44 defines with the adjacent surface of the chamber 36 a passage 48 which connects with a suitable sump (not shown). The ports 39, 40 and 41 are sized and shaped in relation to the cylindrical valve 27 so that when the latter extends through one or more of these ports, flow of the fluid employed in the governor through the port or ports in question is denied as presently described.

Also slidable in a pocket 49 in the casing 18 is a piston valve 50 which, as presently explained, has a capacity for snap action and is provided with a reduced neck 51 that extends across the lower part of the chamber 36, as viewed in Fig. 2, and in spaced relation to and through ports 52 and 53 respectively provided in the walls 43 and 42. The ports 52 and 53 are sized and shaped in relation to the piston valve 50 so that when the latter extends through one or both of these ports, flow of the liquid therethrough is prevented. For a purpose presently explained, a plurality of longitudinal passages 54 extend completely through the piston valve 50 and the right end of the neck 51 terminates in a head 55 that is slidable in a passage 56 which connects with the cavity 22 and a suitable sump (not shown).

In the position of parts shown in Fig. 2, the head 55 abuts the left end of a pin 57 that is coaxially slidable through a sleeve 58 which in turn is slidable in the casing 18. The right end of the sleeve 58 terminates in a flange 59 within a chamber 60 and this flange normally abuts a wall 61 forming part of the chamber 60 by virtue of a pressure established thereagainst as presently explained.

The governor 13 requires the passage of a suitable fluid, this term being used generically, and for present purposes, it will be assumed to be a selected oil which circulates freely therethrough at times when the converter speed ratio is at or above the point selected for effecting a transmission shift and when, due to increasing load on the power train, the speed ratio drops below the indicated point, provision is made through the parts identified to rapidly increase the pressure of the oil in the governor for effecting through certain devices presently described the application of pressure to the transmission gear clutch.

For the above purpose, a suitably driven pump 62 withdraws oil from the sump for delivery to a passage 63 which connects through a passage 64 with the chamber 60 so that pump pressure is always available against the flange 59 and pin 57 to bias the same towards the position shown in Fig. 2. The passage 63 also connects through a throttling orifice 65 with a passage 66, one end of which communicates with the passage 45 and also through the ports 53 and 52 with the passages 46 and 47, respectively. With the valve 27 in the retracted position shown in Fig. 2, the ports 39, 40 and 41 are also open so that the oil flows freely at atmospheric pressure through the passages 45, 46 and 47 to the passage 48 and thence to the sump. Pressure, however, is present in the chamber 60 and acting on the pin 57 maintains the piston valve 50 in the retracted position shown in Fig. 2.

The other end of the passage 66 connects through a pipe 67 with a relay valve 68 schematically shown in Fig. 2 and intended to only illustrate the principle and not to be restrictive as to structural detail. Pressure set up in the pipe 67 at the time of governor operation acts on a spring biased valve 69 and shifts the same to register an annular groove 70 thereon with ports connecting with pipes 71 and 72 communicating respectively with an air supply at suitable pressure and an air actuated clutch (not shown) in the transmission 12 for effecting the gear shift.

From Fig. 2, it will be apparent that the magnetic relation existing between the disks 23 and 24 normally effects a synchronous rotation thereof and that when the rotative speeds of the disk 23 and valve 27 are different, the latter will shift axially by reason of its threaded relation to the disk 24. In other words, when the rotative speed of the valve 27 is less than that of the disk 23, the valve 27 shifts to the left from the position shown in Fig. 2, and from such shifted position towards the right when the rotative speed of the valve 27 exceeds that of the disk 23.

The belts 15 and 16 are designed to achieve synchronous rotation of the disk 23 and valve 27 at a selected speed ratio of the converter 11 which is termed the shift point thereof. Hence, if it be assumed that the power train in Fig. 1 is under load when the disk 23 and valve 27 are rotating at the same speed and that this load is increased, this change will be reflected in a rotative speed drop of the valve 27, or a decrease in the speed ratio of the converter 11. To insure operation of the converter 11 at some point on the high portion of its efficiency curve as will be more clearly established in connection with the two shift governor shown in Figs. 7 to 10, inclusive, the governor 13 effects a shift to a lower gear ratio in the transmission 12 to improve the leverage of the power train on the load. The manner in which this is accomplished will now be described.

With the governor parts in the positions shown in Fig. 2, the power train under some load such that the rotative speed of the valve 27 is not less than that of the magnet disk 23, i.e., the converter 11 is operating at or above its shift point as above defined, oil pressure in the passages 45 to 48, inclusive, is at zero gage and the oil flows freely therethrough. Assuming an increase in load, the rotative speed of the valve 27 drops and the latter begins moving towards the left in Fig. 2 to thereby successively close the ports 39 and 40 and hence deny flow through the passages 45 and 46 and to begin throttling the oil flow through the port 41 as shown in Fig. 3. This throttling action effects a pressure rise in the passages 45, 46, 47 and 66 and also in the passages 54 to become effective against the left end of the piston valve 50. The same pressure also acts against the head 55.

The valve 50 then shifts towards the right to the position shown in Fig. 3 where it closes the port 52, this movement being effected against the pin 57. With the port 52 closed, flow through the passage 47 is prevented and the throttling situation at the port 41 no longer has value. Flow through the passages 45 and 46 having been previously shut off, the valve 50 rapidly completes its stroke to the position shown in Fig. 4 wherein it closes the port 53, this movement being a snap action. This latter phase of the movement of the valve 50 is against the joint resistance of the oil pressure loaded pin 57 and sleeve 58 as also shown in Fig. 4. Hence, the pressure in the passage 66 rises very rapidly and effects a shift of the relay valve 68 with accompanying connection of the air supply pipe 71 and pipe 72 leading to the gear clutch (not shown) in the transmission 12.

The movement of the valve 27 to the left continues until the stem 35 is stopped by the cover 20 as shown in Fig. 4 and at this time, the disk 24 rotates relative to the magnet disk 23 as permitted by the magnetic slip between these parts and constituting an important feature of the invention.

With the parts in the position shown in Fig. 4, if the speed ratio of the converter increases, the valve 27 begins moving towards the right and successively opens the ports 41, 40 and 39, but the valve 50 does not move from the position shown in Fig. 4 until with the opening of the port 39, the passage 45 connects with the sump passage 48, the pump pressure acting against the pin 57 and sleeve 58 snaps the valve 50 to the position shown in Fig. 2, and the low gear clutch in the transmission 12 is disengaged.

The snap acting movement of the valve 50 is independent of the rate of longitudinal movement of the valve 27, i.e., the latter which may be termed the translating movement may be creeping where the difference in the rotative speeds of the magnet disk 23 and valve 27 is small, or may be rapid where the indicated difference is substantially larger. In either case, the piston valve 50 moves with great rapidity at the shift point to insure application of full pressure to the clutch in the gear transmission 12. The governor is totally free from hunting since the piston valve 50 can only occupy either of the extreme positions shown in Figs. 2 and 4, respectively. Further, the use of the concentric pin 57 and sleeve 58 insures that the force acting on the piston valve 50 through these parts is dependent on the oil pressure in the governor thus enabling the use of any reasonable pressure. In the present design, this pressure may range from 10 to 100 p.s.i. and is thus more flexible than if the valve 50 operated against a spring resistance.

Figures 5, 6:
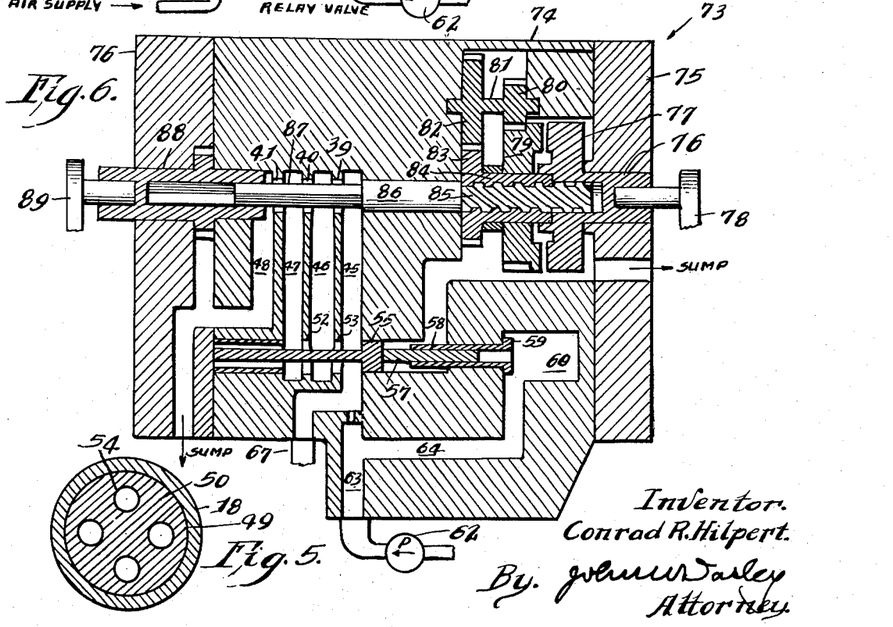
Fig. 5 is an enlarged section along the line 5—5 in Fig. 2.
Fig. 6 is a sectional elevation of a modified, single shift, speed ratio governor.

In Fig. 6 is shown a modification of the governor which is generally identified by the numeral 73. Many of the parts are identical with those shown in Fig. 2 and hence carry the same numerals. Otherwise, the governor 73 includes a casing 74 having end plates 75 and 76 and through the former plate extends in journaled relation the hub 76 of a magnet disk 77. The disk 77 is driven by a belt 78 corresponding in function to the belt 16 in Fig. 2, or, in other words, the magnet disk 77 is driven by the converter output shaft 17.

Cooperating with the magnet disk 77 and normally magnetically locked thereto is an armature disk 79 which is peripherally toothed to mesh with a gear 80. The latter gear is mounted on a shaft 81 common to a gear 82 which meshes with a gear 83 having a hub 84 on which the armature disk 79 is freely journaled. Interiorly, the hub 84 has screw relation to the threaded end 85 of a valve 86 which corresponds in function to the valve 27. As with the latter valve, the other end 87 of the valve 86 is squared or splined, extends, in the retracted position shown in Fig. 6, through the ports 39, 40 and 41 and is drivenly received in a sleeve 88 journaled in the casing 74 and end plate 76 and driven by a belt 89 corresponding in function to the belt 15 and hence driven by the converter input shaft 14.

Assuming that a gear shift is desired at 0.2 in terms of converter speed ratio, the gear train including the armature disk 79 and gears 80, 82 and 83 is arranged so that the speed of the gear 83 is five times that of the armature disk 79 for any given converter output speed. Otherwise, the operation of the governor 73 is identical with the governor 13, but with one advantage in that in the former, there is a 5 to 1 speed reduction of the highest speed parts, the exact reduction depending upon the ratio of the toothed armature disk 79, and the gears 80, 82 and 83.

Figure 11:
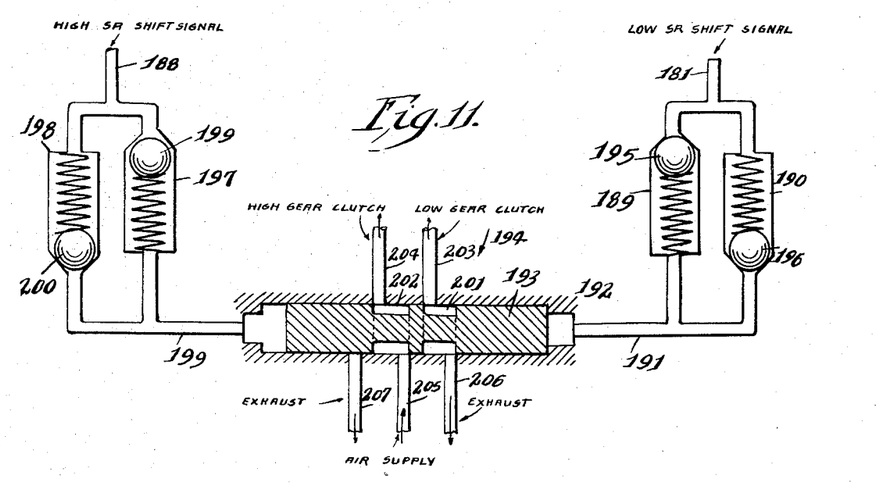
Fig. 11 is a circuit schematic for use with the Fig. 7 governor.
Figure 12:
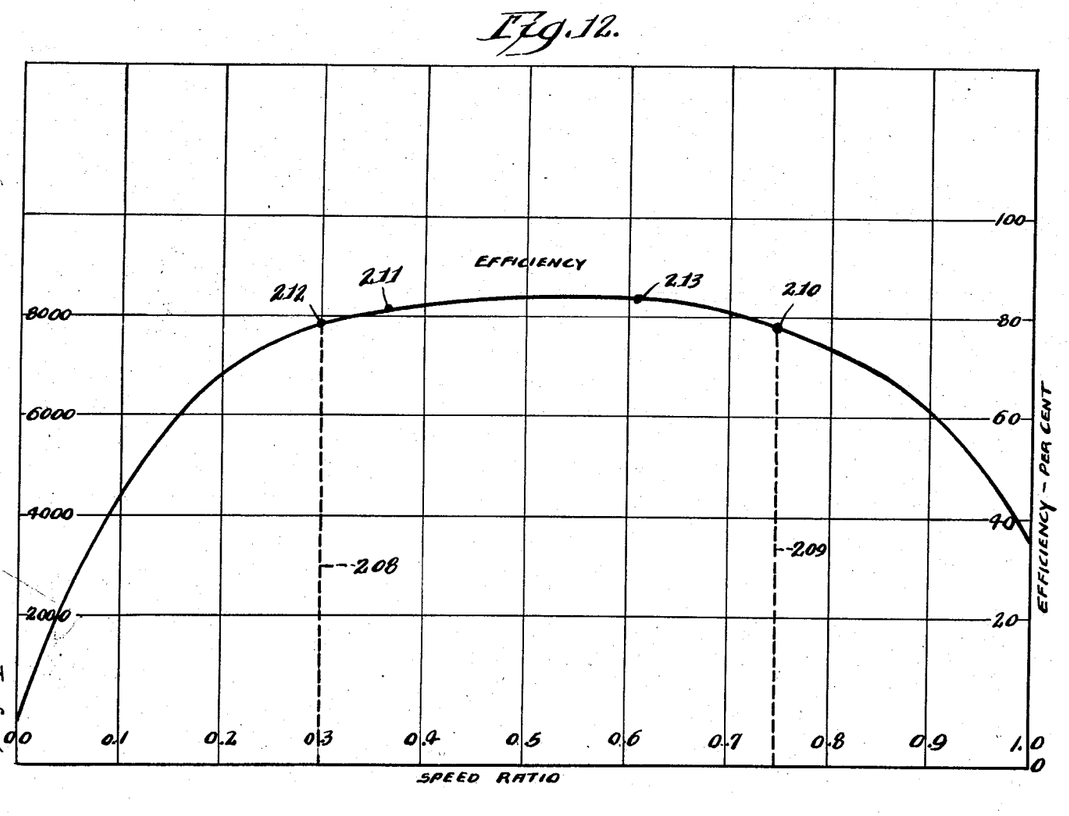
Fig. 12 is an efficiency curve pertaining to the Fig. 7 governor showing suggested shift points in relation to indicated speed ratios of the converter.

In Figs. 7 to 10, inclusive, as supplemented by Figs. 11 and 12, is illustrated a further variant of the governor and its relation to a hydraulic torque converter in maintaining the operation of the latter on the most favorable portion of its efficiency curve. This governor, identified generally by the numeral 90 is of the composite type and was especially designed for locomotive application wherein the gear transmission 12 in Fig. 1 has two power shift, gear ratios whose selection is determined by the composite governor at some shift points corresponding to selected high and low speed ratios of the converter 11. Generically considered, however, the composite governor 90 illustrates the principle of operably relating multiple governing mechanisms in a package unit which is conditioned for response to a corresponding number of speed ratios in the converter 11, and also to a unit which will exhibit two or more signals or impulses in response to variations in the speed ratios of a number of associated shafts forming part of a power train.

The composite governor 90 (see Fig. 7) includes a two part casing 91 having end covers 92 and 93 and is positioned in relation to the converter 11 as shown in Fig. 1. Journaled in the cover 93 is a shaft 94 whose outer end is conditioned for driven connection with the converter input shaft 14 by a belt functionally equivalent to the belt 15 and schematically identified by the angle arrow 95. Within the upper part of the casing 91, the shaft 94 carries a gear 96 having an extension 97 which is telescoped within and secured to one end of a sleeve 98. Within the other end of the sleeve 98 and secured thereto is an annular, permanent magnet 99 so that, as in Fig. 2, this magnet always rotates at some speed proportional to that of the shaft 14 (see Fig. 1).

The magnet is operably related to an armature disk 100 which is journaled in the casing 91 and is normally magnetically locked to the magnet 99 as explained for the Fig. 2 governor. The nut 100 is threaded on a stem 101 at one end of a cylindrical valve 102 which is arranged for axial and rotary movements in and through an intermediate wall 103 in the upper part of the casing 91. The other end of the valve 102 is reduced to provide a stem 104 that extends in spaced relation through ports 105, 106 and 107 which are sized to fit the valve 102 and are provided in spaced, parallel walls 108, 109 and 110 that extend transversely across a chamber 111 and define with parts of the casing 91 and with each other when considered in adjacent pairs passages 112, 113, 114 and 115. The right end of the stem 104 is secured to a shaft 116 which carries a gear 117 and is journaled in the cover 92, the shaft 116 extending therethrough and being driven by a belt functionally equivalent to the belt 16 (see Fig. 1) and schematically designated by the angle arrow 118. The valve 102 is therefore always driven at a speed proportional to that of the converter output shaft 17 and the parts described above constitute the high speed ratio governor 119 of the composite unit 90 with the exception of the associated snap acting valve corresponding to the valve 50 in Fig. 2.

Figure 7:
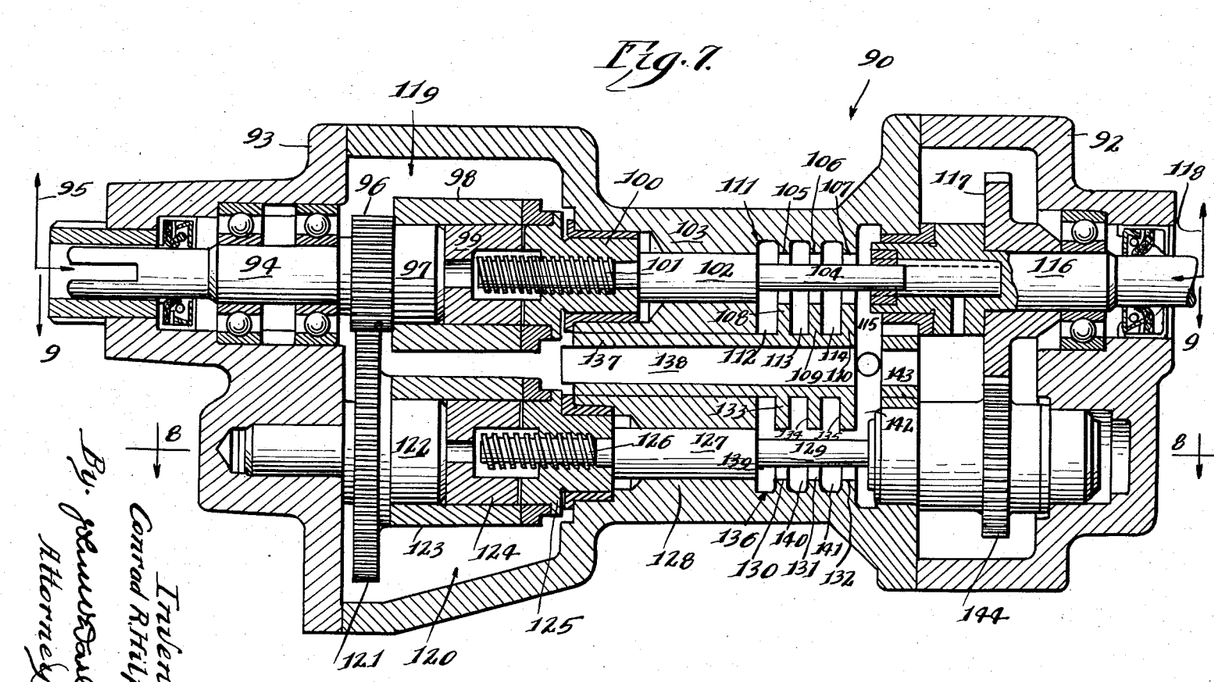
Fig. 7 is a sectional elevation of a further modification which is arranged to effect two shifts in an associated power shift gear transmission.

For the low speed ratio governor 120 with the exception of its associated snap acting valve and still referring to Fig. 7, the gear 96 meshes with a gear 121 journaled in the cover 93 and having a substantially larger pitch diameter than the gear 96 and whose axis is parallel to that of the governor 119. The gear 121, through the medium of an extension 122 and sleeve 123 as related for the governor 119, carries an annular permanent magnet 124 which is operably related to an armature disk or nut 125 threaded on an extension 126 forming part of a valve 127 axially and rotatably movable in and through an interior wall 128 in the lower portion of the casing 91. Normally, therefore, the nut 126 is magnetically locked to the magnet 124 and rotates therewith.

The right end of the valve 127 is reduced to provide a stem 129 which extends through and in spaced relation to ports 130, 131 and 132 which are sized to fit the valve 127 and are respectively provided in spaced, parallel walls 133, 134 and 135 that extend transversely across a chamber 136 that is separated from the chamber 111 by a plate 137 that is clamped between the two parts of the casing 91 and may include a passage 138 therethrough for venting the gear ends of the governor 90. The walls 133, 134 and 135 define with parts of the casing 91 and with each other when considered in adjacent pairs passages 139, 140, 141 and 142, the passages 115 and 142 being always in communication with each other and with a sump passage 143 generally shown in Figs. 7 and 8. The right end of the stem 129 is drivenly connected to a gear 144 that is journaled in the cover 92 and meshes with and has a smaller pitch diameter than the gear 117. Hence, for any given speed of the shaft 116 as applied by the converter output shaft 17, the gear 144 rotates at a higher speed relative to the shaft 116.

Figure 8:
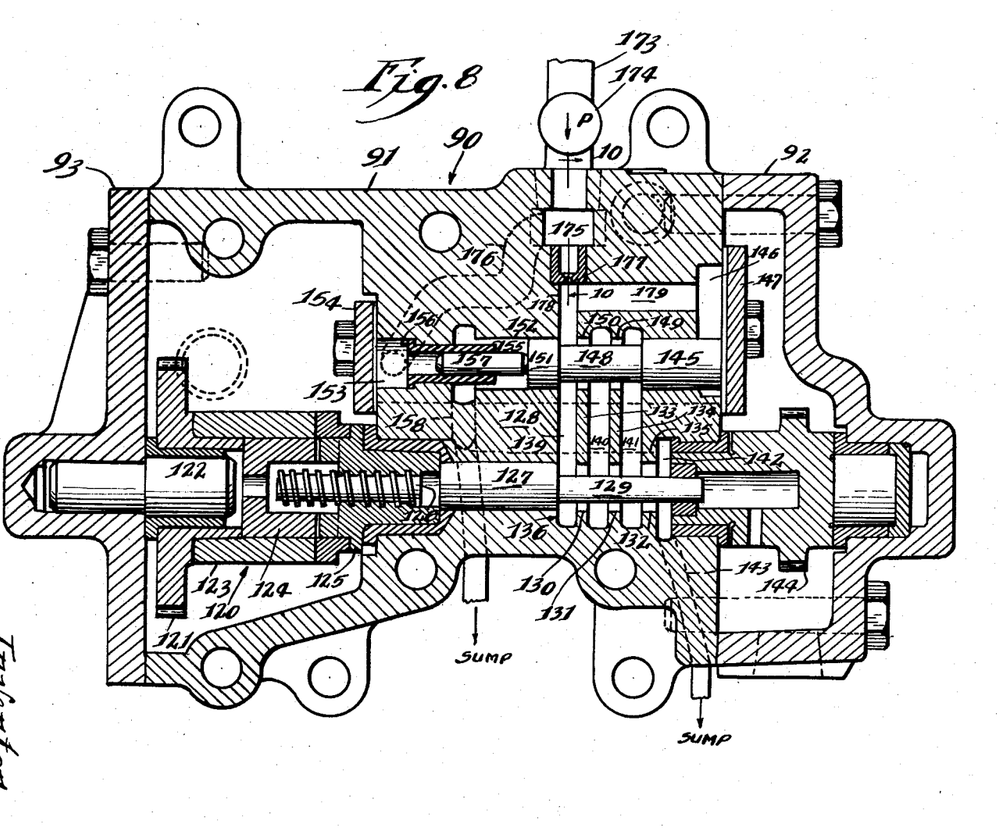
Figs. 8 and 9 are sections along the lines 8—8 and 9—9, respectively, in Fig. 7.

For the snap acting valve assembly that is associated with the low speed ratio governor 120, reference is had to Fig. 8. The piston or snap acting valve 145 is slidable in the interior wall 128 and its right end, as viewed in Fig. 8, extends within a chamber 146 defined by a recessed portion of the wall 128 and a plate 147 attached thereto. The opposite end of the valve 145 extends as a reduced neck 148 in spaced relation to and through ports 149 and 150 which are sized to fit the valve 145 and are respectively provided in the walls 134 and 133 and terminates in a head 151 that is slidable in one end of a cylindrical cavity 152 also in the wall 128. The opposite end of the cavity 152 terminates in a chamber 153 defined by a recessed part of the wall 128 and an attached plate 154. Slidably mounted in a reduced portion of the cavity 152 is a sleeve 155 having a flanged end 156 which normally abuts a shouldered portion of the chamber 153 under pressure established therein as presently described. Coaxial with the sleeve 155, slidable therethrough and also subject at one end to the last noted pressure is a pin 157 whose opposite end abuts the head 151 in all positions of the snap acting valve 145. Drainage of the cavity between the reduced portion thereof and the head 151 to insure the desired operation of the valve 145 is effected through a sump passage 158.

Figures 9, 10:
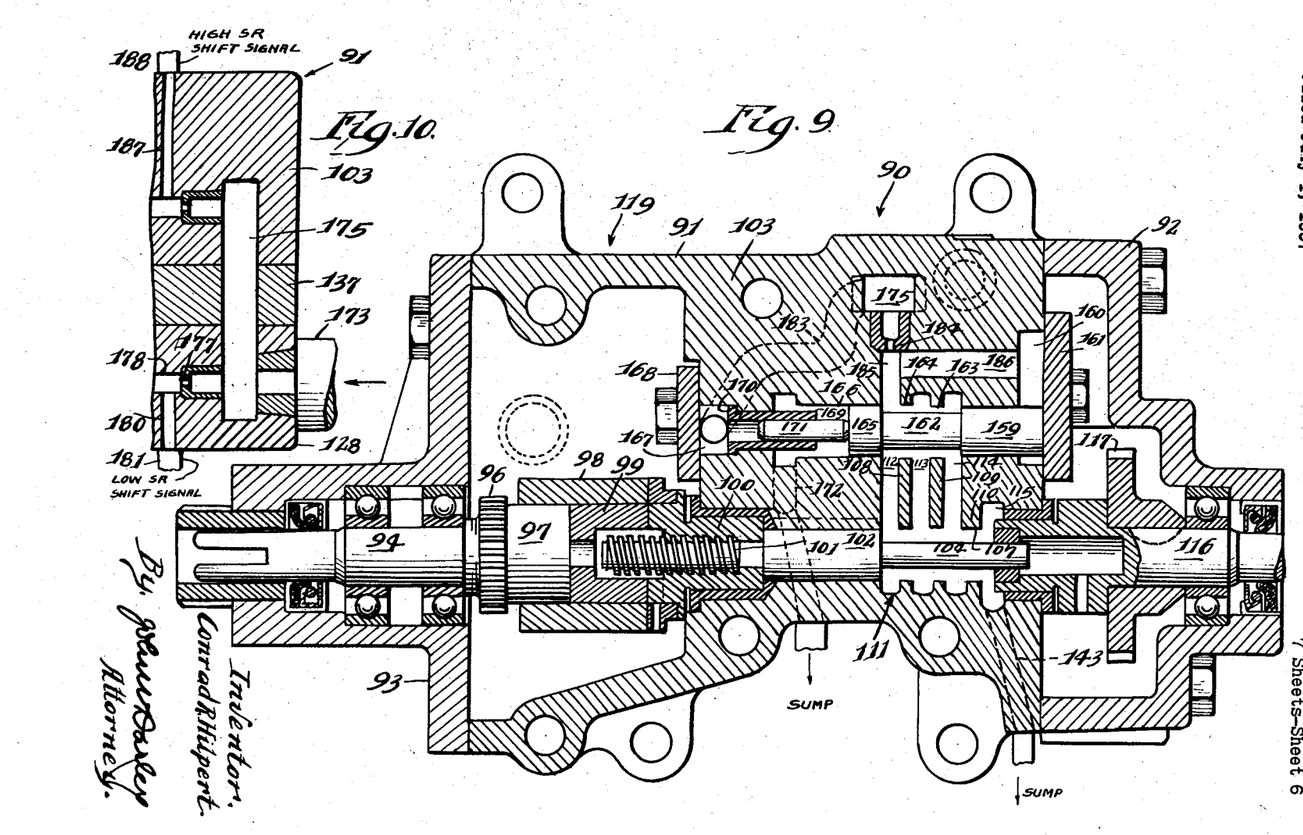
Fig. 10 is a fragmentary section along the line 10—10 in Fig. 8.

For the high speed ratio governor 119, the relation of its snap acting valve thereto is shown in Fig. 9 to which reference will now be made. This valve 159 is slidable in the interior wall 103 and its right end, as viewed in Fig. 9, extends within a chamber 160 defined by a recessed portion of the wall 103 and a plate 161. The opposite end of the valve 159 extends as a reduced neck 162 in spaced relation to and through ports 163 and 164 sized to fit the valve 159 and provided, respectively, in the walls 109 and 108 and terminates in a head 165 that is slidable in one end of a cylindrical cavity 166 also in the wall 103. The opposite end of the cavity 166 terminates in a chamber 167 defined by a recessed part of the wall 103 and an attached plate 168. Slidable in a reduced portion of the cavity 166 is a sleeve 169 having a flanged end 170 which normally abuts a shouldered portion of the chamber 167 under a pressure established therein as presently described. Coaxial with the sleeve 169, slidable therethrough and also subject at one end to the last noted pressure is a pin 171 whose opposite end abuts the head 165 in all positions of the snap acting valve 159. Drainage of the cavity 166 between the reduced portion thereof and the head 165 to insure the characteristic operation of the valve 159 is effected through a sump passage 172.

For ease of disclosure, separate sump passages 143, 158 and 172 have been shown, but it will be understood that the working oil from all sources which is en route to the sump would be collected in a convenient chamber in the casing 91 and discharged to the sump through a common outlet.

Referring to Figs. 8 and 10, the oil for the governor 90 is supplied through a pipe 173 which includes a suitably driven pump 174 to an elongated chamber 175 that extends transversely through the walls 103 and 128 and separator plate 137 and has its ends terminating within the walls 103 and 128, respectively. The chamber 175 provides an oil reservoir under pressure which is common to both governors.

For the low speed ratio governor 120 (see Fig. 8), oil pressure in the chamber 175 is effective through a passage 176 in the wall 128 to the chamber 153. Also for the same governor, oil flow from the chamber 175 is throttled by an orifice 177 which communicates with a passage 178 that connects with the chamber 136, and a passage 179 connects the passage 178 with the chamber 146. When the chamber 136 communicates with the sump, the valve 145 will be biased to the retracted position shown in Fig. 8 by pressure in the chamber 153 acting through the pin 157.

The operation of the governor 120 is identical with that shown in Fig. 2, being determined by the gears 96 and 121, and the gears 117 and 144, in association with the speeds of the belts 95 and 118, respectively. When the snap acting valve 145 shifts to the left, as viewed in Fig. 8, in response to the rapidly rising pressure in the passages 139 and 178, this pressure becomes effective through a passage 180 (see Fig. 10) in the wall 128, the opposite ends of the passage 180 connecting with the passage 178 and a low speed ratio signal pipe 181 leading to a relay valve presently described.

For the high speed ratio governor 119 (see Figs. 9 and 10), pressure in the chamber 175 is effective through a passage 183 in the wall 103 to the chamber 167. Also in the same governor, oil flow from the chamber 175 is throttled by an orifice 184 which communicates with a passage 185 that connects with the chamber 111, and a passage 186 connects the passage 185 with the chamber 160. The pressure relations against the ends of the sleeve 169 and pin 171, and that against the snap acting valve 159 are identical with those acting on the subassembly including the snap acting valve 145 and its immediately associated parts.

The operation of the governor 119 is identical with the Fig. 2 governor being determined by the speed of the belts 95 and 118. When the snap acting valve 159 shifts to the left, as viewed in Fig. 9, in response to the rapidly rising pressure in the passages 112 and 185, this pressure becomes effective through a passage 187 (see Fig. 10) in the wall 103, the opposite ends of the passage 187 connecting with the passage 185 and a high speed ratio signal pipe 188 leading to a relay valve presently described.

Considering that the governor 90 is used in the power train shown in Fig. 1 which includes a high and low gear, power shift transmission each of whose gear ratios are brought into operation by a fluid actuated clutch in the well known manner, there is schematically shown in Fig. 11 a suggested relay valve control for determining the selection of either clutch in response to a pressure signal from one of the governors. In the present instance, the clutches in the gear transmission are assumed to be of the air actuated type and Fig. 11 shows the system conditioned to engage the high gear clutch. It will be understood that the relay valve control shown is only by way of example and not restrictive since modifications would be required if the gear clutches were oil or mechanically actuated. If the governor is large enough, the relay valve is unnecessary.

Referring to Fig. 11, the low speed ratio signal pipe 181 connects through parallel ducts 189 and 190 with a pipe 191 leading to one end of a casing 192 having slidable therein a piston valve 193 which is frictionally held in any position to which it is moved, the casing 192, valve 193 and associated pipes presently described constituting a relay valve 194. The duct 189 has mounted at one end thereof a spring loaded valve 195 which opens in response to actuating pressure in the pipe 181, while the duct 190 has mounted in one end thereof a spring loaded valve 196 which opens when the pipe 181 connects with the sump to release actuating pressure hitherto acting against the right end of the piston valve 193.

The high speed ratio signal pipe 188 connects through parallel ducts 197 and 198 with a pipe 199 leading to the other end of the casing 192, the duct 197 corresponding to the duct 189 and including a spring loaded valve 199 and the duct 198 corresponding to the duct 190 and including a spring loaded valve 200. Hence, the valves 195 and 199, and the valves 196 and 200, respectively, are functionally identical.

The piston valve 193 is annularly recessed to provide in conjunction with the wall of the casing 192 spaced annular chambers 201 and 202. Leading from the casing 192 are pipes 203 and 204 which respectively connect with the chambers 201 and 202 in all positions of the piston valve 193 and respectively connect with the clutches of the low and high speed gears forming part of the transmission 12 (see Fig. 1). Also connecting with the casing 192 is an air supply pipe 205 for providing pressure to actuate the gear clutches and exhaust pipes 206 and 207, one for each gear clutch.

In the position of parts shown in Fig. 11, the governor 90 has functioned to establish a high speed ratio, pressure signal in the pipe 188 so that the piston valve 193 has shifted to the right to place the pipes 205 and 204 in communication through the annular chamber 202 to supply pressure to the high gear clutch while the low gear clutch is released since the pipe 203 connects through the chamber 201 with the exhaust pipe 206.

When the governor 90 emits a low speed ratio, pressure signal to the pipe 181, the piston valve 193 shifts to the left, pressure is admitted to the pipe 203 to engage the low gear clutch, while the high gear clutch exhausts through the pipe 207. Pressure theretofore acting against the left end of the piston valve 193 exhausts through the duct 198 to the sump.

The advantages of the governor 90 when used in conjunction with a hydraulic torque converter whose input shaft connects with a locomotive engine while the output shaft is coupled to a two speed, power shift transmission is exemplified in Fig. 12 which shows the efficiency curve of a typical converter which is employed for such service, the curve being plotted against the speed ratios of the converter. The converter speed ratios at which gear shifts are required are assumed to be 0.3 and 0.75 denoted, respectively, by the numerals 208 and 209 and governor operation at these ratios would be determined by appropriately relating the speeds of the belts, and the sizes of the gears 96 and 121, the gears 117 and 144. It will be noted that the higher portion of the efficiency curve is between these points and, for best results, it is important that the converter operate within the indicated range and not on the falling portions of the curve. It will further be assumed that the belt 95 (see Fig. 7) drives the governor input shaft 94 at the speed of the shaft 14 (see Fig. 1) and in the same direction while the belt 118 drives the governor input shaft 116 at a speed 1.342 times that of the shaft 17. When the speed ratio of the converter is at or above 0.75, the governor 90 emits the high speed ratio signal insuring functioning of the high gear in the transmission 12, and when at or below 0.3, the governor determines release of the high gear and operation of the low gear.

If the transmission 12 is in low gear with a light drawbar pull, the converter 11, for example, may be operating at 0.75 speed ratio or point 210 on the efficiency curve. The governor 90 will therefore be conditioned to emit the high speed ratio, pressure signal which shifts the relay valve 193 to the position shown in Fig. 11 to thus place the high gear of the transmission 12 in operation, the gear ratios in the transmission being assumed to be 1.45 for high and 0.71 for low. The converter speed ratio drops, for example, to 0.365 or point 211 on the efficiency curve and the locomotive may be accelerated in high gear.

If the load is increased, as by climbing a grade, the speed ratio of the converter may drop to 0.3 or point 212 on the curve when the governor 90 will emit the low speed ratio, pressure signal to thereby effect release of the high gear and operation of the low gear in the transmission 12. The speed ratio of the converter 11 may then rise to 0.607 or point 213 on the curve. In each case, there is an increase in efficiency resulting from the transmission shift and the converter 11 always operates on the best portion of its efficiency curve.

I claim:

1. The combination of an hydraulic torque converter, input and output shafts respectively connected to the impeller and turbine of the converter, a gear transmission connected to the output shaft including fluid shift means for determining a gear shift, and mechanism responsive to a change in a predetermined speed ratio of the shafts comprising a casing having a chamber including a sump outlet, a pressure outlet and an inlet for receiving a pumped fluid, connecting means between the pressure outlet and fluid shift means, rotatable input members adapted to be respectively driven at the same speed by the shafts when at said speed ratio, nut means arranged to normally synchronously rotate with one of the input members, stem means extending through the chamber and having one end driven by the other input member and the other end threaded through the nut means, the stem means including a cylindrical valve rotatable in the casing and axially shiftable to throttle fluid flow through the sump outlet when said speed ratio changes and thereby increase the pressure in the chamber, and a piston valve responsive to the pressure increase and shiftable thereby to a position denying flow to the sump outlet whereby sufficient pressure operating through the connecting means is established at the pressure outlet to determine a gear shift in the transmission.

2. A combination as defined in claim 1 wherein the nut means normally synchronously rotates with that input member which connects with the input shaft.

3. A combination as defined in claim 1 wherein one of the input members is a permanent magnet driven by the input shaft and the nut means is an armature associated with the magnet.

4. A combination as defined in claim 1 wherein the piston valve is constructed and arranged on its opposite ends to snap to a position closing the sump outlet when the pressure increase reaches a predetermined value.

5. The combination of an hydraulic torque converter, input and output shafts respectively connected to the impeller and turbine of the converter, a gear transmission connected to the output shaft including fluid shift means for determining a gear shift, and mechanism responsive to a change in a predetermined speed ratio of the shafts comprising a casing having a chamber traversed by end walls and an intermediate wall spaced from each other and the casing walls to define end and intermediate passages, first and second groups of aligned ports in the walls normally providing communication between the passages, a sump outlet normally communicating with one end passage, a pressure outlet and an inlet for receiving a pumped fluid and communicating with the pressure outlet and normally with all of said passages, connecting means between the pressure outlet and fluid shift means, rotatable input members adapted to be respectively driven at the same speed by the shafts when at said speed ratio, nut means arranged to normally synchronously rotate with one of the input members, stem means extending through the first group of ports and having one end driven by the other input member and the other end threaded through the nut means, the stem means including a cylindrical valve rotatable in the casing and axially shiftable to block flow through all ports in the first group except for a throttling flow through the sump connecting port of the first group when said speed ratio changes, a piston valve slidable in the casing in alignment with the ports of the second group and normally biased at one end to a position uncovering the last named ports, and passage means extending through and exposing the piston valve to the inlet pressure whereby when the cylindrical valve is in said throttling position, the piston valve is snapped to a position blocking the ports of the second group to rapidly increase the pressure in the pressure outlet and effect through the connecting means a gear shift in the transmission.

6. A combination as defined in claim 5 wherein the nut means normally synchronously rotates with that input member which connects with the input shaft.

7. A combination as defined in claim 5 wherein one of the input members is a permanent magnet driven by the input shaft and the nut means is an armature associated with the magnet.

8. A combination as defined in claim 5 wherein the piston valve has a larger area on one end than the other and the biasing of the piston valve is effected by exposing the large end to sump pressure and applying pump pressure to the other end.

9. The combination of an hydraulic torque converter, input and output shafts respectively connected to the impeller and turbine of the converter, a gear transmission connected to the output shaft including a pair of fluid shift means for determining two gear shifts, and mechanism responsive to changes in two predetermined speed ratios of the shafts comprising first and second assemblies responsive to the changes, respectively, the first assembly comprising first rotatable input members adapted to be respectively driven at the same speed by the shafts when at one of said speed ratios, first nut means arranged to normally synchronously rotate with one of the first input members, and first stem means driven by the other first input member and threaded through the first nut means for axial shifting when one change in the speed ratio occurs, and the second assembly comprising second rotatable input members having gear connections to the first input members, respectively, and adapted to be driven at the same speed when the shafts are at the other of said speed ratios, second nut means arranged to normally synchronously rotate with one of the second input members, and second stem means driven by the other second input member and threaded through the last named nut means for axial shifting when the other change in the speed ratios occurs, each assembly including a casing having a chamber provided with a sump outlet, a pressure outlet and an inlet for receiving a pumped fluid, connecting means between the pressure outlets and an associated fluid shift means, each stem means including a cylindrical valve rotatable in the associated casing and axially shiftable to throttle fluid flow through the associated sump outlet when the corresponding speed ratio changes to thereby increase the pressure in the associated chamber, and a piston valve in each chamber responsive to the pressure increase therein and shiftable thereby to a position denying flow to the associated sump outlet whereby sufficient pressure operating through the connecting means is established at the pressure outlet to determine a gear shift in the transmission.

10. In a power transmission including a gear transmission having fluid shift means for determining a gear shift, the combination of an hydraulic torque converter, an input shaft connected to the converter impeller, an output shaft providing a connection between the converter turbine and gear transmission, and mechanism responsive to a change in a predetermined speed ratio of the shafts for determining a speed shift in the gear transmission comprising a casing having a chamber including a sump outlet, a pressure outlet adapted for connection to the fluid shift means and an inlet for receiving a pumped fluid, rotatable input members adapted to be respectively driven at the same speed by the shafts when at said speed ratio, nut means arranged to normally synchronously rotate with one of the input members, stem means extending through the chamber and having one end driven by the other input member and the other end threaded through the nut means, the stem means including a cylindrical valve rotatable in the casing and axially shiftable to throttle fluid flow through the sump outlet when said speed ratio changes and thereby increase the pressure in the chamber, and a piston valve responsive to the pressure increase and shiftable thereby to a position denying flow to the sump outlet whereby sufficient pressure is established at the pressure outlet to determine operation of the fluid shift means.

References Cited in the file of this patent

UNITED STATES PATENTS

| | | |
|---|---|---|
| 2,676,497 | Ahlen | Apr. 27, 1954 |
| 2,707,408 | Ahlen | May 3, 1955 |